Figure 1:
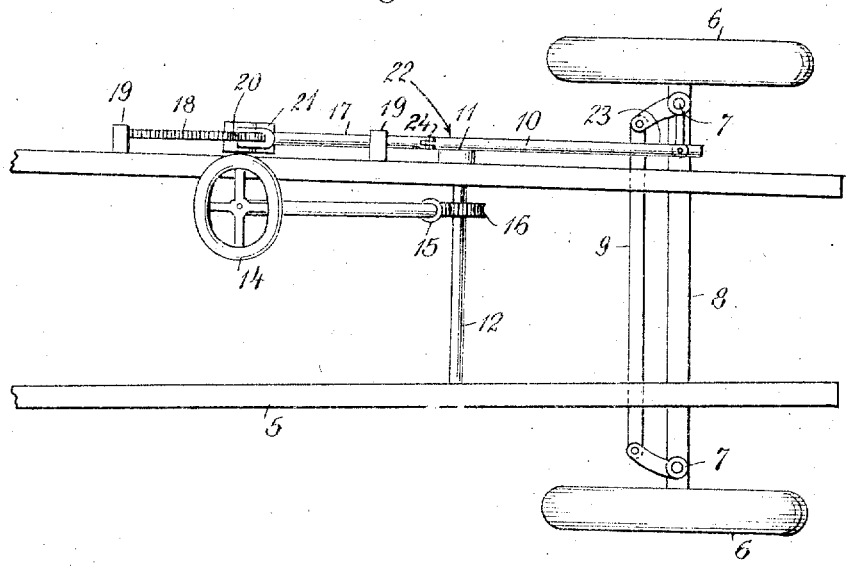

April 8, 1924. Re. 15,812

M. J. DAVIS

ANTISKIDDING DEVICE

Original Filed March 21, 1922

INVENTOR

Michael J. Davis

BY

Davis Davis Marvin & Edmonds,

ATTORNEY

Reissued Apr. 8, 1924. Re. 15,812

UNITED STATES PATENT OFFICE.

MICHAEL J. DAVIS, OF BROOKLYN, NEW YORK.

ANTISKIDDING DEVICE.

Original No. 1,440,660, dated January 2, 1923, Serial No. 545,624, filed March 21, 1922. Application for reissue filed December 31, 1923. Serial No. 683,829.

*To all whom it may concern:*

Be it known that I, MICHAEL J. DAVIS, a citizen of the United States, residing at Brooklyn, in the county of Kings and State of New York, have invented certain new and useful Improvements in Antiskidding Devices; and I do hereby declare the following to be a full, clear, and exact description of the invention, such as will enable others skilled in the art to which it appertains to make and use the same.

This invention relates essentially to a device for stabilizing the steering mechanism and front wheels of a motor vehicle to the end that lateral slip or skidding of the rear wheels is prevented. The device comprises a combination of cooperating members connected between the chassis and the steering mechanism, the character of the members being such that the distortion of the chassis and the relative displacement of the chassis and steering mechanism, caused by the forces which tend to produce side slip or skidding of the rear wheels, causes the device to function so as to prevent skidding.

It is well known that when the steering gear of a common motor vehicle is given a sudden or sharp inclination, it causes the rear of the vehicle, especially on a slippery roadway, to side-slip; and it is the object of the present invention to obviate this by means of a device associated with the steering gear and the vehicle chassis. Experience has shown that when the rear of a motor vehicle skids, the alignment of the front wheels with respect to the vehicle chassis changes; and it is also true that the rear of the vehicle will not side-slip or skid if the position of the front wheels with respect to the chassis can be maintained constant. If the front wheels are held so that the rear of the vehicle cannot pivot on them, the vehicle may slide as a whole, or continue in the direction the front wheels are headed.

In order to acquire a proper understanding of this invention, it is necessary to consider the fact that just prior to the instant when the rear wheels of a vehicle start to skid, the body of the vehicle is tilted, and the chassis is distorted and displaced with respect to the steering mechanism and front wheels. The forces which produce this displacement are of considerable magnitude, and are exerted in such a manner that the displacement produced is eccentric or irregular.

In view of the facts outlined above, it is evident that skidding of the rear wheels of a vehicle may be prevented by a device responsive to the relative displacement of the chassis and steering mechanism, this device acting to prevent the forces tending to produce skidding, from effecting a change in the position of the front wheels with respect to the chassis. Experiments have shown that this can be accomplished by means of a device which exerts a comparatively small force on the steering mechanism, at the proper instant.

In general, my invention comprises two friction members, one of which is adapted to be fixed to the vehicle chassis, and the other adapted to be connected to the steering mechanism. These members are mounted on the vehicle in such a manner that, under normal conditions, they have no appreciable effect on the operation of the vehicle. The device is brought into play only when a relative displacement occurs between the chassis and the steering mechanism, such as is caused by the forces tending to produce skidding, or by one of the front wheels striking an obstruction in the road.

Figure 2:
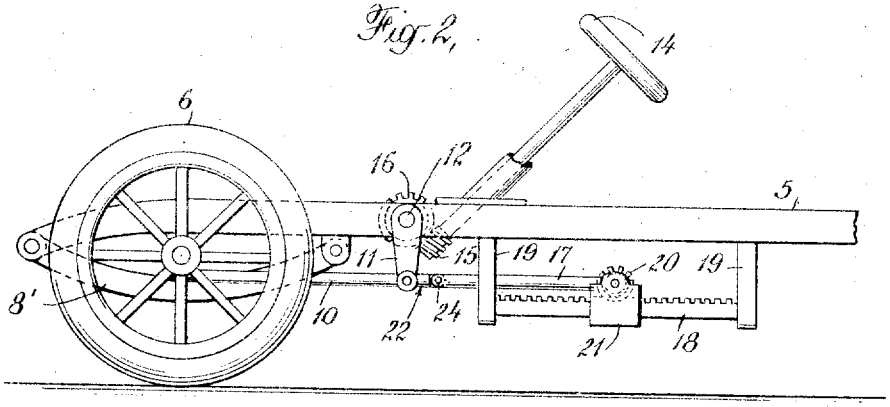

The novel features of this invention are more fully described in the following detailed description, and illustrated in the accompanying drawing, in which:

Fig. 1 is a plan view of the front part of a motor vehicle equipped with the improved device, and Fig. 2 is a side elevation of the parts shown in Fig. 1.

In the figures of the accompanying drawings, the numeral 5 designates a frame or chassis, and 6, 6 are the front wheels of a motor vehicle. The front wheels 6, 6 are adapted to be oscillated to steer the vehicle in any direction by being mounted on knuckle joints 7 connected to an axle 8 which is yieldingly connected to the frame 5 by means of the springs 8′. A cross tube 9 couples the two knuckle joints 7 together so that they will work in unison, to steer both wheels. A drag link 10 is actuated by a crank 11 fulcrumed at 12 to the chassis; and a hand wheel 14 with a worm 15 engaging a pinion 16 mounted on the fulcrum is operated to steer the car, as is well known. As usually constructed, the drag link 10 is provided at the points 22 and 23 with coil springs which absorb the vibrations transmitted through the knuckle joints 7, 7 from the front wheels 6, 6.

In the embodiment of the invention illustrated in the accompanying drawings, the means for preventing side-slip or skidding of the rear of the vehicle, comprises a link 17 connected to the drag link 10 by means of the joint 24, thus forming an extension of the drag link. The friction members which I prefer to use, consist of a rack 18 and pinion 20, the pinion being rotatively connected to the link 17, and the rack being rigidly fastened to the chassis by any suitable means, such as the hangers or brackets 19. The rack may be mounted with the rack teeth projecting upward, as shown in the drawing, or the rack may be inverted and fixed to the chassis with the teeth facing downward. A U-shaped slide 21 guides the pinion 20 in a rectilinear path.

I prefer to make the link 17 out of steel tubing so that it will be somewhat flexible, and I also prefer to have the length of this member substantially equal to that of the drag link 10 so as to have these parts properly balanced. The U-shaped slide 21 may hang considerably below the rack 18, or it may be in sliding contact therewith. This slide should be wide enough and short enough so that when the link 17 is displaced laterally, the pinion teeth will bind in the rack teeth before the slide has an opportunity to bind on the sides of the rack.

If the rack is mounted with its teeth extending downward, the slide 21 should hold the pinion 20 in fairly close contact with the rack teeth.

It is well known to those familiar with machine elements that a rack and pinion arranged so that the pinion rests on the rack or is held in close contact therewith, will operate properly as a gear system, only when the pinion and rack are in direct alignment. If the pinion is turned with respect to the rack, or if one side of the pinion is forced deep into the rack teeth, the pinion binds in the rack and relative movement of the rack and pinion is rendered practically impossible. In the present invention I have utilized this characteristic of the rack and pinion combination to stabilize the front wheels of a motor vehicle, and to prevent the rear wheels from skidding.

In order to understand the operation of this invention, one must bear in mind the fact that the several joints, for example those connecting the drag link 10 with the knuckle 7 and with the crank 11, are normally loose, and therefore will permit considerable side play or lateral displacement of the link 17. The forward end of the drag link 10 swings in an arc of a circle the plane of which is horizontal, while the rear end of this link swings in an arc the plane of which is vertical. Furthermore, most of the common types of steering gear are irreversible to a considerable degree, and therefore the function of the antiskidding device is merely to supplement the retarding action of the steering gear at the proper instant to prevent skidding.

The functioning of this invention to prevent skidding may be understood by considering the movements of the vehicle parts contained in two transverse planes of the vehicle, one plane passing through the pinion and the other passing through the fulcrum of the crank 11. The forces which tend to produce skidding, cause the several vehicle parts contained in the forward plane (the plane passing through the fulcrum of crank 11) to rotate several degrees with respect to the parts contained in the rear plane passing through the pinion. This angular displacement, or partial rotation, occurs about a longitudinal axis of the vehicle, and causes the lower end of the crank 11, and therefore the forward end of the link 17, to swing in toward the chassis, or in the opposite direction, as the case may be. The forward end of the link 17 is not only displaced sideways, but it is also twisted to some extent by virtue of the movement of crank 11. Innumerable tests have shown that this combined lateral displacement and torsion produces sufficient binding of the rack and pinion to prevent the forces tending to produce skidding from effecting a change in the position of the front wheels with respect to the chassis. Thus the resistance offered by the binding rack and pinion, together with that offered by the steering mechanism itself, prevents skidding of the rear wheels by holding the front wheels in position.

When either of the front wheels of the vehicle strikes an obstruction in the road, this invention serves as an efficient shock absorber, and prevents the front wheels from changing their course. If a front wheel strikes an obstacle which tends to change the position of the wheel, the knuckle joint 7 causes the forward end of the drag link 10 to commence swinging around in its arcuate path. Due to the inertia of the steering mechanism, and the resistance produced by virtue of the partial irreversibility of this mechanism, the first reaction caused by the irregular movement of the front wheel is a lateral bending of the composite member consisting of the drag link 10 and the link 17. It has been observed that a sharp blow on one front wheel will produce this condition. The play in the joint connecting the drag link 10 and the crank 11 permits sufficient lateral displacement of the forward end of link 17 to produce the necessary binding action between the rack and pinion.

It is also to be observed that when one of the front wheels of the vehicle strikes an obstacle in the road, conditions are produced not unlike those existing when the vehicle is about to skid. The front wheel, in passing over the obstacle in the road, produces a distortion of the chassis frame which, in turn, causes the rack and pinion to bind in the manner described above.

While the binding action of my improved device is sufficiently pronounced to stabilize the front wheels and the steering mechanism, and to prevent skidding of the rear wheels under any conditions, yet this action does not at any time interfere with the steering of the vehicle by turning the hand wheel 14. As pointed out above, it does not require a large force in addition to that produced by the steering mechanism, to maintain the front wheels in position so as to prevent skidding; and the stabilizing force required is likewise comparatively small. Under normal conditions, the improved device is inactive, and the pinion rolls up and down on the rack as the steering mechanism is operated. When the device does act, either to prevent skidding or to stabilize the front wheels, the binding friction developed between the rack and pinion is merely sufficient to produce the desired results. There is seldom, if ever, any positive locking of the rack and pinion, and its operation is usually momentary. Even when the chassis is continuously distorted for a considerable time, as occurs when one tire is deflated, it is still possible to steer the vehicle with comparative ease, the device producing only a slight effect on the operation of the steering mechanism.

One plausible explanation of the fact that the improved device does not interfere with the normal operation of the steering mechanism, is that when the steering mechanism is actuated to steer the vehicle, the movement of the shaft 12 and of the crank 11 connected thereto is such as to pull the link 17 in such a manner as to bring the pinion 20 into alignment with the rack 18. But aside from any theory advanced by way of explaining this action, extensive experiments have established beyond doubt the fact that the improved device does not interfere with the normal operation of the steering mechanism.

The improved device can be enclosed in a casing to prevent any dust, dirt or small objects from settling on the actuating parts. This is particularly desirable where the rack is mounted with the teeth facing upward.

I claim—

1. In a device of the character described, the combination of a member adapted to be fixed with respect to the chassis of a vehicle, a second member adapted to be connected to the steering system of the vehicle, the said members being in contact with each other and arranged to cooperate so that they will bind when they are out of alignment with each other.

2. In a device of the character described, the combination of a friction member, means for fixing said member to the chassis of a vehicle, a second friction member, and means for connecting said second member to the drag link of the steering system of the vehicle, the said friction members being in contact with each other and arranged to cooperate so that they will bind when they are out of alignment with each other.

3. In a device of the character described, a friction member, means for fixing said member to the chassis of a vehicle so that the member will extend longitudinally thereof, a second friction member, means for connecting said second member to the drag link of the steering system of the vehicle, and means for constraining said second member to move in a rectilinear path parallel to said first member, the said friction members being in contact with each other and arranged to cooperate so that they will bind when they are out of alignment with each other.

4. In a device of the character described, the combination of a friction member, means for fixing said member to the chassis of a vehicle, a rotary friction member, and means for connecting said rotary member to the steering system of the vehicle, said friction members being in contact with each other and arranged to cooperate so that they will bind when they are out of alignment with each other.

5. In a device of the character described, the combination of a rack, means for fixing said rack to the chassis of a vehicle, a pinion adapted to engage the rack, means for connecting said pinion to the steering system of the vehicle, and means for holding said pinion in position on said rack, the said rack and pinion being arranged to cooperate so that they will bind when they are out of alignment with each other.

6. In a device of the character described, the combination of a rack, means for securing said rack to the chassis of a vehicle, a pinion, a slide associated with said rack and said pinion for holding said pinion in position, and means for connecting said pinion to the drag link of the steering system of the vehicle, the said rack and pinion being arranged to cooperate so that they will bind when they are out of alignment with each other.

7. In a device of the character described, the combination with a frame provided with devices for steering a motor vehicle, of a guide member carried by the frame, a rotary member slidably mounted on the guide, and means connecting said rotary member to the steering devices.

8. In a device of the character described, the combination with a frame provided with devices including a drag link for steering a motor vehicle, of a rack secured to the frame, a slide mounted on the rack, a pinion carried by the slide to engage the rack, and means connecting the drag link of the steering devices with the pinion.

In testimony whereof I affix my signature.

MICHAEL J. DAVIS.